Patented Feb. 8, 1949

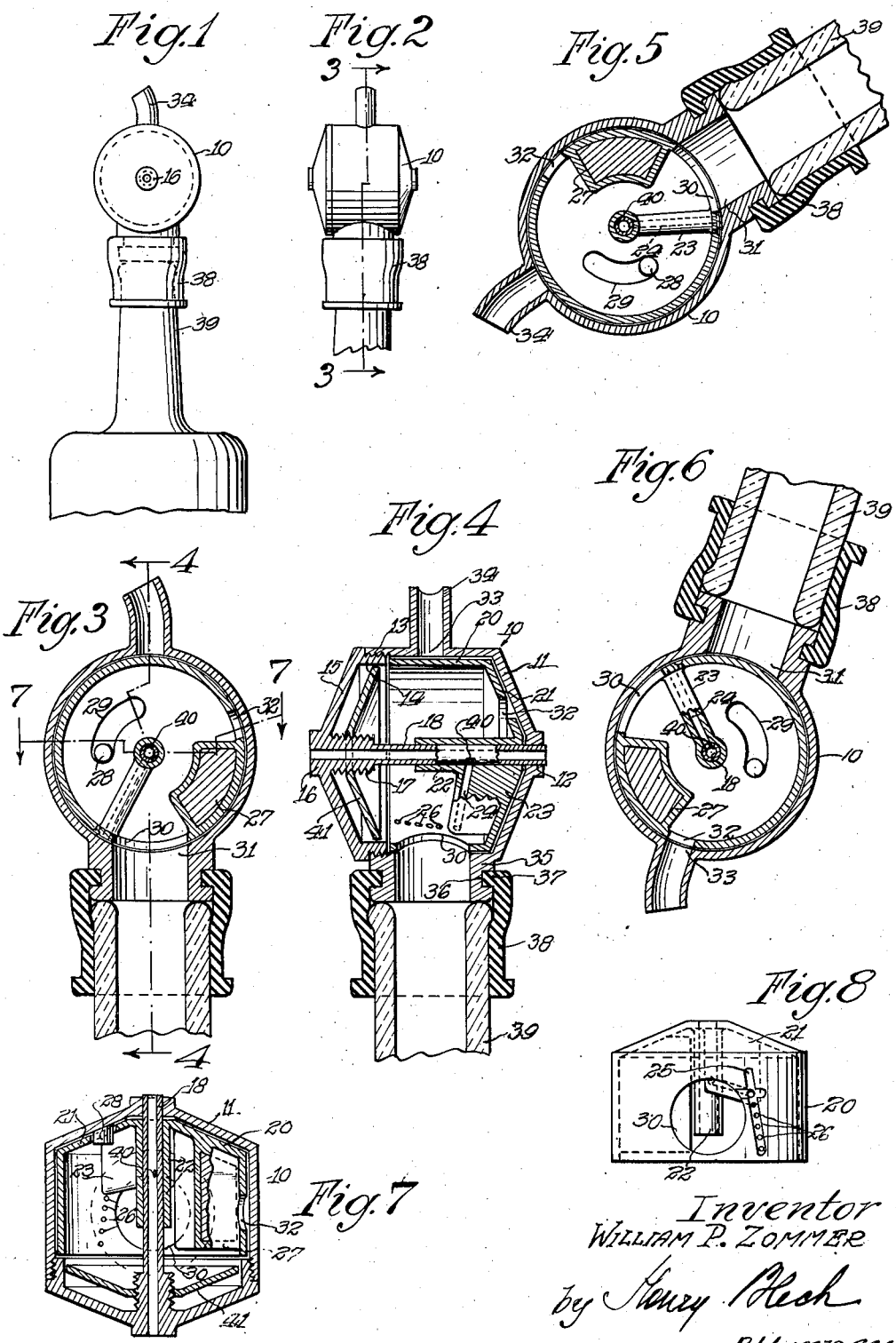

2,461,363

UNITED STATES PATENT OFFICE 2,461,363

DISPENSER WITH MEASURING CHAMBER OF ADJUSTABLY VARIABLE CAPACITY

William P. Zommer, Lake Zurich, Ill.

Application December 11, 1945, Serial No. 634,206

2 Claims. (Cl. 222—362)

The invention relates to liquid dispensers and more particularly to dispensers which may be applied to bottles.

It is an object of the invention to provide a dispenser which is a self-contained unit and may be expeditiously applied to the neck of the bottle.

It is a further object to provide a dispenser which does not extend into the bottle but is merely applied to the neck and forms a continuation thereof.

It is also an object to provide a dispenser which is gravity controlled and forms a measuring device to permit a predetermined amount of liquid to be decanted.

A still further object constitutes the provision of a dispenser wherein the measuring device may be adjusted to permit varying quantities of liquid to be decanted.

Another object aims at providing a dispenser wherein upon tilting of the bottle a predetermined quantity is trapped in a chamber and upon further tilting of the bottle the liquid is discharged.

It is also an object of the invention to provide a dispensing device which is a closed casing in which a predetermined quantity of liquid is trapped in a chamber and the trapped liquid is subsequently decanted.

It is a still further object to provide certain features of construction and arrangement of parts tending to enhance the utility and efficiency of a device of the character specified.

With these and other objects in view which will become more apparent from a perusal of the invention, the latter comprises the means described in the following specification, particularly pointed out in the claims forming a part thereof and illustrated in the accompanying drawing, in which:

Fig. 1 is a fractional elevational view of a bottle to which my invention has been applied.

Fig. 2 is a side view of the parts shown in Fig. 1.

Fig. 3 is an enlarged section on the line 3—3 of Fig. 2.

Fig. 4 is a section on the line 4—4 of Fig. 3.

Fig. 5 is a view similar to Fig. 3 with the device in position to trap a predetermined amount of liquid.

Fig. 6 is a view similar to Fig. 5 with the device in decanting position.

Fig. 7 is a section on the line 7—7 of Fig. 3 and Fig. 8 is a top plan view of the measuring drum.

Referring to the several views in the drawing the dispenser comprises a cylindrical casing 10 having a side wall 11 formed integral with the casing and shaped conically.

The side wall 11 is provided at the apex with an opening 12. The other side of the cylinder 10 is open and provided with internal threads 13 to mesh with the threads on the reduced cylindrical extension 14 of a conically shaped cover-plate 15.

At the apex the cover plate 15 is traversed by a tubular member 16 which is provided with threads 17 for a portion of its length and continues with a reduced diameter to form a hollow axle 18 which enters the opening 12 at the casing wall 11.

A measuring drum comprises a cylinder 20 formed at the right end, as viewed in Fig. 4, with an integral conically shaped side wall 21 provided at the apex with an opening communicating with the bore of a horizontal bearing sleeve 22 formed integral with the wall 21 and rotatable on the axle 18.

The drum is provided with an internal boss 23 extending from the sleeve 22 to the cylinder 20 and has a port 24 opening into the bore of the sleeve at one end and communicating at the other end with a slanting groove or channel 25 on the outer surface of the drum (Fig. 8) in which a plurality of apertures 26 are provided for the passage of air as will be hereinafter further explained.

A counter weight 27 holds the drum normally in the position shown in Fig. 3, in which a pin 28 extending axially from the casing wall 11 engages one end of a segmental or arcuate slot 29 provided in the drum wall 21 and holds the drum in a certain position.

The drum 20 is provided with an opening 30 adapted to register with an opening 31 in the cylinder 10.

A smaller opening 32 in the drum is adapted to register with an opening 33 in the cylinder 10 where a spout 34 permits egress of the liquid in the decanting position.

The cylinder 10 is formed with a tubular extension 35 whose bore is co-extensive with the opening 31. The extension 35 is formed with an external circumferential groove 36 in which enters the flanged end 37 of a rubber sleeve 38 adapted to encompass the neck 39 of a bottle to secure the device to a bottle.

The hollow axle 18 is provided with an opening 40 which is adapted to communicate with the port 24 of the boss 23 in a certain position of the latter.

In use the device is applied to a bottle as indicated in Figs. 1 and 3 in which position the counterweight 27 holds the drum 20 in position wherein the openings 30 and 31 register, whereas the opening 32 is out of registry with the opening 33 and the spout 34.

Upon tilting of the bottle as indicated in Fig. 5 the liquid from the bottle flows through the extension 35 and the registering openings 30 and 31 into the drum 20 to fill the same.

Upon continued tilting the counterweight 27 causes the drum 20 to rotate until the pin 28 engages the opposite end of the slot as shown in Fig. 6.

In this position the drum opening 30 is no longer in registry with the opening 31 but the opening 32 is in registry with the opening 33 and consequently with the spout 34 so that the liquid trapped in the drum may be decanted.

In order to permit the liquid to flow freely from the drum provision is made for ingress of air to the drum chamber.

In the decanting position the opening 40 of the hollow axle is in registry with the port 24 so that air flows through the hollow shaft through opening 40, bore 24, channel 25, and apertures 26 into the interior of the drum. It is, of course, within the scope of the invention to provide other means for permitting air to enter the drum.

In order to enable variations of the amount of liquid measured off and trapped in the drum, a conical disk 41 provided with a threaded central aperture is mounted on the tubular member 16.

The rotation of the disk will vary its distance from the drum wall 21 to enlarge or diminish the cubic content of the drum chamber so that varying quantities of liquid may be trapped in the drum in the drum filling position.

The disk may be rotated manually or if preferred external means may be provided for causing rotation of the disk.

The drawing discloses by way of example one embodiment of the invention. Various modifications and changes may be made within the spirit of the invention.

I, therefore, do not limit myself to the constructional details nor to the arrangement of parts, as shown, but include all alterations, arrangements and revisions constituting departures within the scope of the invention as defined in the appended claims.

I claim:

1. In a liquid dispenser, a closed casing having an inlet and outlet opening for the passage of liquid and adapted to be secured to a bottle, a hollow axle traversing said casing, a drum rotatably mounted on said axle and having spaced openings for alternate registry with the openings of said casing, a counterweight in said drum to cause rotation thereof upon tilting of the bottle to thereby trap the liquid in said drum and subsequently permit dispensing of the liquid from the casing, means for varying the quantity of liquid trapped in said drum, means for arresting the drum in the positions where its openings respectively register with appertaining openings of said casing, and means for placing the drum in communication with the bore of the axle in the dispensing position.

2. A liquid dispenser, including a casing having ingress and egress openings and adapted to be secured to a bottle, a drum in said casing having ingress and egress openings and movable relative thereto, means for bringing respectively the ingress and egress openings of the casing and drum in alternate and successive registry, a disk mounted for axial reciprocation in said drum to minutely vary its cubic content and the amount of liquid entering said drum, and means for admitting air to said drum upon registry of said egress openings.

WILLIAM P. ZOMMER.

REFERENCES CITED

The following references are of record in the file of this patent:

UNITED STATES PATENTS

| Number | Name | Date |
|---|---|---|
| 589,775 | Akeson | Sept. 7, 1897 |
| 844,067 | Wares et al. | Feb. 12, 1907 |
| 1,165,508 | Irish et al. | Dec. 28, 1915 |
| 1,577,235 | Hucks | Mar. 16, 1926 |
| 2,209,766 | Dale et al. | July 30, 1940 |

FOREIGN PATENTS

| Number | Country | Date |
|---|---|---|
| 641,696 | Germany | Feb. 10, 1937 |